(12) United States Patent
Fleischhacker

(10) Patent No.: US 10,688,934 B2
(45) Date of Patent: Jun. 23, 2020

(54) LOADING SPACE ARRANGEMENT FOR A MOTOR VEHICLE

(71) Applicant: Dr. Ing. h.c. F. Porsche Aktiengesellschaft, Stuttgart (DE)

(72) Inventor: Robert Fleischhacker, Tiefenbronn-Muehlhausen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 107 days.

(21) Appl. No.: 15/955,753

(22) Filed: Apr. 18, 2018

(65) Prior Publication Data

US 2018/0319345 A1 Nov. 8, 2018

(30) Foreign Application Priority Data

May 4, 2017 (DE) .......................... 10 2017 109 527

(51) Int. Cl.
*B60R 5/04* (2006.01)
*B60R 21/06* (2006.01)
*B60R 21/02* (2006.01)

(52) U.S. Cl.
CPC ............ *B60R 5/048* (2013.01); *B60R 21/026* (2013.01); *B60R 21/06* (2013.01)

(58) Field of Classification Search
CPC .......... B60R 5/047; B60R 5/04; B60R 5/045; B60R 7/02; B60R 5/044; B60R 21/06; B60R 11/00; B60R 2011/0075
USPC ......... 296/37.16, 24.43, 37.14, 37.8, 193.07, 296/65.05, 37.7; 224/400, 539, 554, 558, 224/564, 571; 348/837, 386, E5.128, 348/E5.132
See application file for complete search history.

(56) References Cited

U.S. PATENT DOCUMENTS

| | | | |
|---|---|---|---|
| 3,181,911 A * | 5/1965 | Péras | B60J 5/101 296/37.1 |
| 4,443,034 A * | 4/1984 | Beggs | B60N 2/3011 296/65.17 |
| 6,176,535 B1 * | 1/2001 | Chaloult | B60N 2/3011 211/134 |
| 6,592,165 B2 * | 7/2003 | Ament | B60R 5/047 296/37.16 |

(Continued)

FOREIGN PATENT DOCUMENTS

DE 7500822 U 6/1975
DE 102010055440 A1 6/2012

*Primary Examiner* — D Glenn Dayoan
*Assistant Examiner* — Sunsurraye Westbrook
(74) *Attorney, Agent, or Firm* — Leydig, Voit & Mayer, Ltd.

(57) ABSTRACT

A loading space arrangement for a motor vehicle includes a foldable loading space cover configured to cover a loading space in a covering position of the loading space cover; a guide system configured to guide the loading space cover between the covering position and a folded-together folded position of the loading space cover; and a lock configured to lock the loading space cover at a height which is vertically spaced apart from the guide system. The guide system is further configured to uncouple the loading space cover from the guide system in the folded position. The lock is further configured to pivot the loading space cover from the folded position into a stowed position.

12 Claims, 2 Drawing Sheets

(56) References Cited

U.S. PATENT DOCUMENTS

| | | | | |
|---|---|---|---|---|
| 7,931,177 B2 * | 4/2011 | Bohlke | ............... | B60R 7/02 |
| | | | | 224/281 |
| 8,491,029 B2 * | 7/2013 | Kusu | ............... | B60R 5/048 |
| | | | | 296/24.43 |
| 2013/0193708 A1 * | 8/2013 | Lucas | ............... | B60R 7/043 |
| | | | | 296/37.16 |

* cited by examiner

LOADING SPACE ARRANGEMENT FOR A MOTOR VEHICLE

CROSS REFERENCE TO RELATED APPLICATIONS

This application claims benefit to German Patent Application No. DE 10 2017 109 527.6, filed May 4, 2017, which is hereby incorporated by reference herein.

FIELD

The invention relates to a loading space arrangement for a motor vehicle, with the aid of which a loading space, in particular a luggage compartment, of a motor vehicle can be covered.

BACKGROUND

DE 10 2010 055 440 A1 discloses a loading space arrangement for a motor vehicle in which a foldable loading space cover is able to be moved between a horizontal covering position and a vertical folded-together folded position, wherein, in the folded position, the loading space cover is able to be fastened at the upper end by a locking means, which is connected to the motor vehicle body, in a manner fixed against movement.

SUMMARY

In an embodiment, the present invention provides a loading space arrangement for a motor vehicle. The loading space arrangement includes a foldable loading space cover configured to cover a loading space in a covering position of the loading space cover; a guide system configured to guide the loading space cover between the covering position and a folded-together folded position of the loading space cover; and a lock configured to lock the loading space cover at a height which is vertically spaced apart from the guide system. The guide system is further configured to uncouple the loading space cover from the guide system in the folded position. The lock is further configured to pivot the loading space cover from the folded position into a stowed position.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
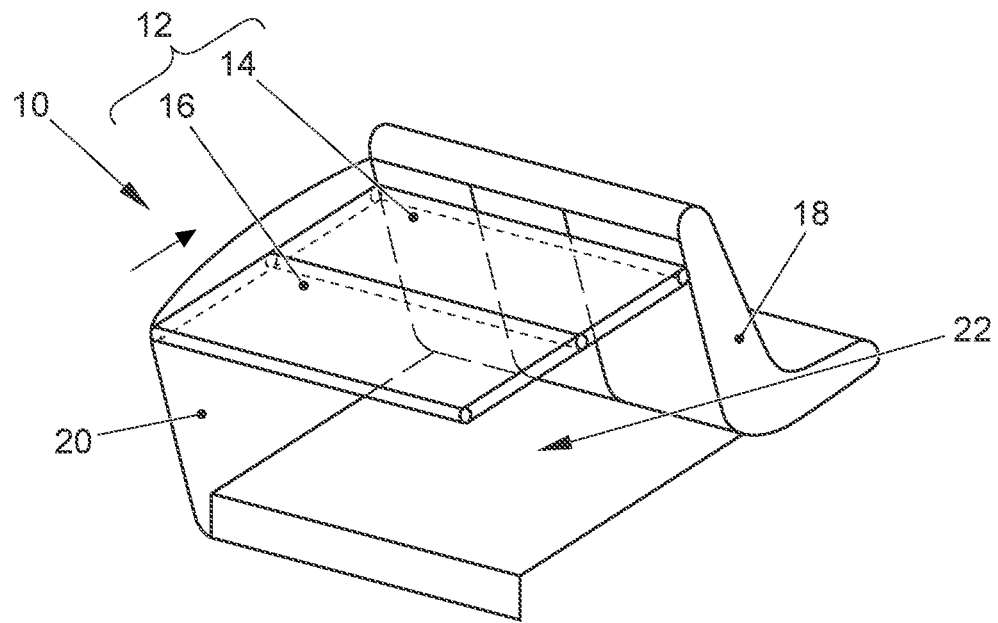
FIG. 1 shows a schematic, perspective view of a loading space arrangement for a luggage compartment of a motor vehicle in a first position.

It is constantly necessary to be able to adapt a loading space of a motor vehicle to differently formed loads. Embodiments of the invention specify measures that allow good adaptation of a loading space of a motor vehicle to differently formed loads.

According to one or more embodiments of the invention, a loading space arrangement for a motor vehicle is provided, having a foldable loading space cover for covering a loading space in a covering position of the loading space cover, a guide system for guiding the loading space cover between the covering position and a folded-together folded position of the loading space cover, and a locking means for locking the loading space cover at a height which is vertically spaced apart from the guide system, wherein the guide system is designed for uncoupling the loading space cover from the guide system in the folded position, and the locking means is designed for pivoting the loading space cover from the folded position into a stowed position.

In the covering position, the loading space cover can, in the manner of a rear parcel shelf, in particular substantially horizontally cover a loading space of the motor vehicle, in particular a luggage compartment, with free space remaining above the loading space cover. This allows loads to be restrained beneath the loading space cover, with the result that the loads are not able to block the view of a driver of the motor vehicle. In the folded-together folded position of the loading space cover, it is possible for the loading space cover to project, in particular substantially vertically, upward. Here, the loading space cover can extend in particular up to an interior roof lining of a roof liner of the motor vehicle. It is possible in particular for the loading space cover to prevent loads entering the passenger compartment from the loading space, for example in the case of a crash, in the manner of a safety net. In order to improve and/or to ensure the safety function of the loading space cover in the folded position, the loading space cover can be fastened by the locking means and connected to the motor vehicle body via the locking means. It is additionally possible to uncouple the loading space cover from the guide system, with the result that the loading space cover can also be completely removed. Here, it is additionally provided that the loading space cover can be uncoupled from the guide system if the loading space cover is connected to the locking means. The loading space cover is in this case not fixed against movement, but rather is connected rotatably to the locking means such that the loading space cover is able to be pivoted about a pivoting axis defined by the locking means. The loading space cover can form an articulation with the locking means. This results in a defined movement of the loading space cover if the loading space cover is uncoupled from the guide system, as a result of which the handling is simplified. In particular, the situation in which the loading space cover drops out and injures a person during the uncoupling is avoided. Moreover, the loading space cover can, in the stowed position, bear on a bulky load, with the result that the load is secured somewhat better and does not damage the roof liner in the case of slippage. Preferably, the load can be confined between a rear side, facing the luggage compartment, of a rear seat bench and the loading space cover in the stowed position and secured against slippage relatively easily. As a result of the loading space cover, which is able to be connected rotatably to the locking means, and is able to be uncoupled from the guide system, in the folded position, it is also possible for the loading space cover to cover bulky loads, and to relatively easily secure said loads against slippage, in the loading space from above, thus allowing good adaptation of a loading space of a motor vehicle to differently formed loads.

The guide system has in particular two guide rails which are preferably provided on the left-hand edge, and on the right-hand edge, of the loading space. The guide rails may have for example a U-shaped profile which is open for example toward the loading space. The loading space cover may have guide elements which are inserted into the guide rails and which are designed for example as sliders. The guide rails may have for example an opening through which the guide elements are able to be moved in order to uncouple the loading space cover from the guide system. The loading space cover may have two or more cover elements which are in each case subsequently connected to one another in an articulated manner such that the loading space cover is able to be folded together. In the folded position, the individual cover elements may be arranged in a planar manner one behind the other.

In particular, the loading space cover has a front cover element and a rear cover element which is connected to the front cover element in an articulated manner about an articulation axis, wherein the locking means is arranged substantially as an axial extension of the articulation axis in the folded position and in the stowed position. In the folded position, it is possible for the articulation axis to be positioned particularly far up, with the result that the loading space cover can be connected to the locking means in an articulated manner at a position which is particularly far in the upward direction. Consequently, the loading space cover can, in the stowed position, also cover particularly large and bulky loads from above.

Preferably, the loading space cover is locked releasably in the folded position and in the stowed position by way of the locking means so as to be mounted via a bearing pin which is mounted rotatably. The articulated connection of the front cover element to the rear cover element can be achieved in a simple manner with the aid of a bearing pin extending along the articulation axis, which pin merely needs to project laterally in order also to act in the locking means as a bearing pin of an articulation formed with the aid of the locking means. The number of components can thereby be kept small.

Particularly preferably, in the locked state, the bearing pin is clipped into a clip-type connection, wherein in particular the bearing pin has a radially projecting head for limitation of axial movement. A bearing shell provided for the bearing pin may be designed as a clip such that the bearing pin is able to snap into the clip automatically in the case of a relative movement of the loading space cover from the covering position into the folded position. In the snapped-in state, the bearing pin may be mounted rotatably in the clip, wherein in particular the radially projecting head, as an axial stop, can prevent said pin slipping out of the clip along the pivoting axis.

In particular, a retaining means, in particular a clip-type connection and/or a detent connection, is provided for fixedly holding a part of the loading space cover, which part is positioned spaced apart from the locking means in the stowed position. The folded-together loading space cover can be held fixedly in a defined stowed position or in multiple defined stowed positions with the aid of the at least one retaining means, as a result of which impact against the roof liner by the load or by the loading space cover can in particular be avoided. It is thus possible to avoid damaging the roof liner. Furthermore, rattling of the loading space cover against the load can be avoided.

Preferably, the loading space cover has at least one guide element which is able to be guided in the guide system, wherein at least one of the guide elements, in particular at least one guide element of the front cover element, is held fixedly by the retaining means in the stowed position. When the loading space cover is pivoted about the locking means, the guide element which is in any case provided for the guidance in the guide system may additionally be used for the fastening by the retaining element, whereby the number of components is kept small. If, for this purpose, use is made of the guide element of that cover element which, in the covering position, is positioned at the front, in particular directly adjacent to a rear side of a rear seat bench, it is possible, in the stowed position, for all further cover elements to be captively held between the front cover element, which is fastened by the retaining element, and the roof liner. Inadvertent unfolding of the loading space cover and/or dropping-out of individual cover elements can thereby be avoided.

Particularly preferably, a roof liner formed by a motor vehicle body is provided for the upper delimitation of a vehicle interior, wherein the loading space cover is arranged adjacent to the roof liner, in particular so as to be in immediate and/or direct contact, in the stowed position. Consequently, the folded-together loading space cover may be stowed under the roof liner in the stowed position, with the result that particularly large loads are able to be stowed in the loading space. Here, the load may project from a luggage compartment into a passenger compartment if necessary, so that particularly bulky loads are also able to be transported. Blockage by the loading space cover is avoided. Moreover, in the stowed position, the loading space cover can protect the roof liner.

In particular, the locking means is positioned substantially in the region of a C pillar. As a result, the locking means can be supported against the C pillar. Consequently, the loading space cover folded together in the folded position and/or in the stowed position can, within the limits of its possibilities, offer additional crash safety and dissipate to the C pillar forces which arise.

Preferably, the guide system has an uncoupling opening which is in particular able to be closed off again and which serves for the uncoupling of at least one guide element of the loading space cover, which guide element is able to be guided in the guide system, wherein the guide element is able to be moved through the uncoupling opening when the loading space cover is pivoted from the folded position into the stowed position. The guide elements can be moved through the at least one uncoupling opening in order to uncouple the loading space cover from the guide system. It is possible for the uncoupling opening to be closed off for example with the aid of a slide or some other closure element in order to avoid inadvertent uncoupling during the folding-together of the loading space cover. The closure element can be held for example by way of spring force in the closed position, wherein the spring force is able to be automatically overcome manually and/or with the aid of an actuator in order to allow uncoupling of the loading space cover from the guide system. Preferably, the closure element has an opening bevel such that the loading space cover, in particular a guide element of the loading space cover, can strike against the opening bevel when the loading space cover moves from the stowed position into the folded position and can move the closure element, possibly counter to a spring force, from the closed position into the open position when sliding on the opening bevel. This allows the loading space cover to be coupled to the guide system again in a simple manner.

Particularly preferably, the loading space cover forms a rear parcel shelf in the covering position, wherein in particular cover elements of the loading space cover which are connected to one another in an articulated manner are, as substantially rigid planar structures, designed for dissipating to the guide system objects set down on the loading space cover. As rigid, substantially unyielding bodies, the cover elements can relatively easily dissipate forces which arise. The loading space cover can thus not only block slippage of loads but can also dissipate weight forces of objects set down on the loading space cover in the covering position. The cover elements may be designed for example as transparent or non-transparent plates or as grates.

The loading space arrangement 10 illustrated in FIG. 1 for a luggage compartment of a motor vehicle has a loading space cover 12 which, in the illustrated exemplary embodiment, has a front cover element 14 and a rear cover element 16 which is connected in an articulated manner. In the illustrated covering position of the loading space cover 12, the front cover element 14 adjoins a rear seat bench 18, while the rear cover element 16 can terminate at a luggage compartment cover. A loading space 22 for loads can be delimited by a motor vehicle body 20, the luggage compartment cover, the rear seat bench 18 and the loading space cover 12.

Figure 2:
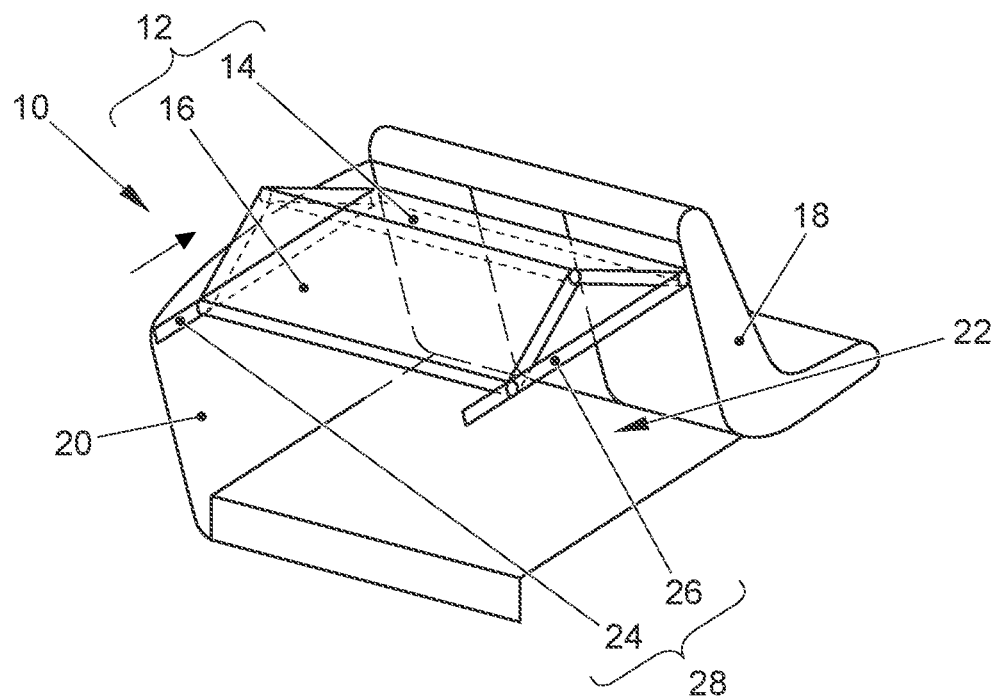
FIG. 2 shows a schematic, perspective view of the loading space arrangement from FIG. 1 in a second position.

As illustrated in FIG. 2, the cover elements 14, 16 of the loading space cover 12 are guided in a linear manner in the direction of travel via guide elements in a left-hand guide rail 24 and a right-hand guide rail 26 of a guide system 28. The loading space cover 12 can thereby be easily folded together until the folded position of the loading space cover 12 illustrated in FIG. 3 is reached.

Figure 3:
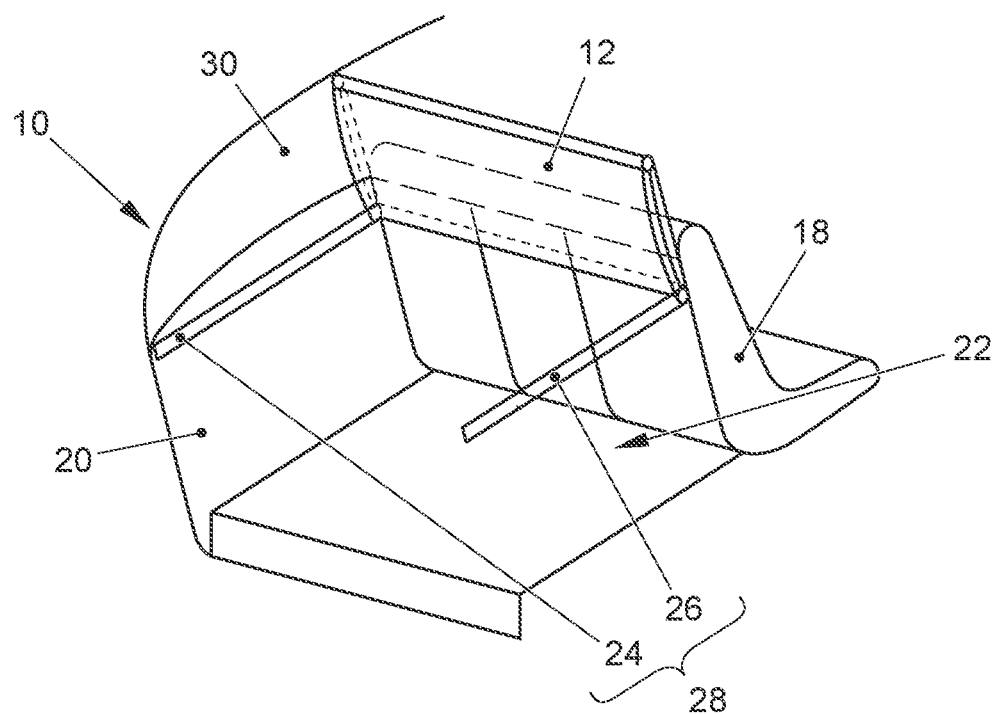
FIG. 3 shows a schematic, perspective view of the loading space arrangement from FIG. 2 in a third position.

In the folded position of the loading space cover 12 illustrated in FIG. 3, the loading space cover 12 can be connected to a locking means in an articulated manner at the upper edge of the loading space cover 12. The locking means is provided in particular as an extension of an articulation axis of the articulated connection of the cover elements 14, 16 such that the loading space cover 12 is articulated substantially on one side at the locking means.

Figure 4:
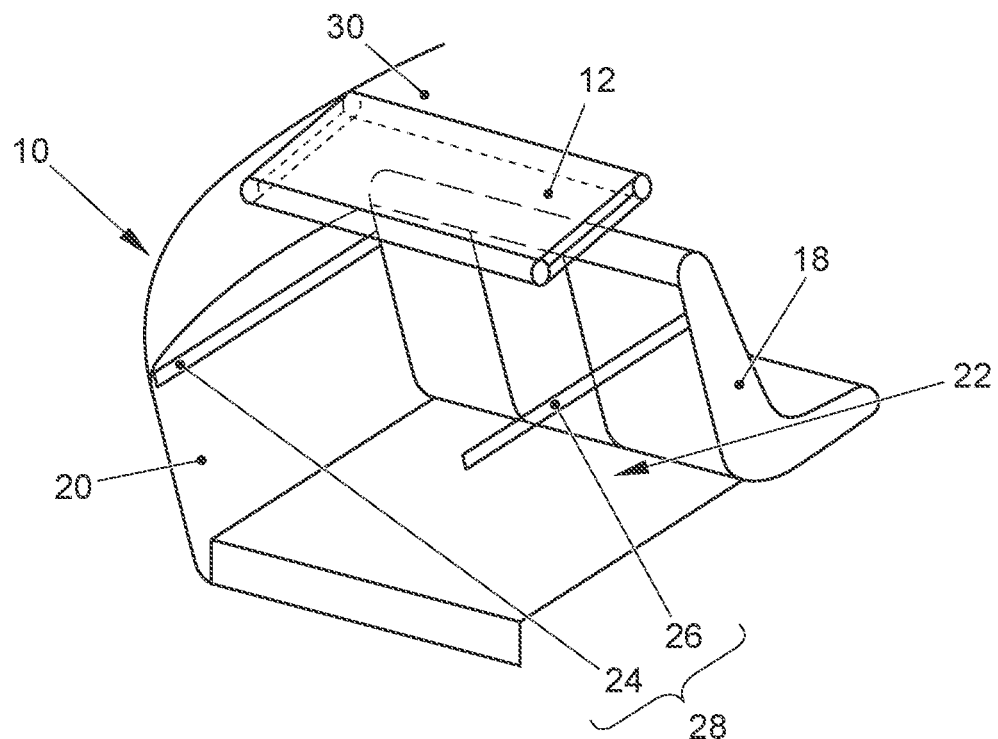
FIG. 4 shows a schematic, perspective view of the loading space arrangement from FIG. 3 in a fourth position.

As is illustrated in FIG. 4, it is possible for the loading space cover 12 to be uncoupled from the guide system 28 and to be pivoted at the locking means into the illustrated stowed position. In the stowed position, the folded-together loading space cover 12 can be positioned as close as possible to a roof liner 30 of the motor vehicle. The loading space cover 12 can be held fixedly in the stowed position with the aid of a retaining element in that, in particular, the front cover element 14 is held fixedly with the aid of the retaining element, and the rear cover element 16 is confined between the front cover element 14 and the roof liner 30.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A loading space arrangement for a motor vehicle, comprising:
   a foldable loading space cover configured to cover a loading space in a covering position of the loading space cover;
   a guide system configured to guide the loading space cover between the covering position and a folded-together folded position of the loading space cover; and
   a lock configured to lock the loading space cover at a height which is vertically spaced apart from the guide system;
   wherein the guide system is further configured to uncouple the loading space cover from the guide system in the folded position,
   wherein the lock is further configured to pivot the loading space cover from the folded position into a stowed position,
   wherein the loading space cover has a front cover element and a rear cover element which is connected to the front cover element in an articulated manner about an articulation axis, and
   wherein the lock is arranged substantially as an axial extension of the articulation axis in the folded position and in the stowed position.

2. The loading space arrangement as claimed in claim 1, wherein the loading space cover is locked releasably in the folded position and in the stowed position by way of the lock so as to be mounted via a bearing pin which is mounted rotatably.

3. The loading space arrangement as claimed in claim 2, wherein, in the locked state, the bearing pin is clipped into a clip-type connection.

4. The loading space arrangement as claimed in claim 1, wherein a retainer is provided for fixedly holding a part of the loading space cover, which part is positioned spaced apart from the lock in the stowed position.

5. The loading space arrangement as claimed in claim 4, wherein the loading space cover has at least one guide element configured to be guided in the guide system, wherein at least one of the guide elements is held fixedly by the retainer in the stowed position.

6. The loading space arrangement as claimed in claim 5, wherein the lock and the retainer are vertically spaced apart from the guide system.

7. The loading space arrangement as claimed in claim 1, wherein a roof liner formed by a motor vehicle body is provided for the upper delimitation of a vehicle interior, wherein the loading space cover is arranged adjacent to the roof liner in the stowed position.

8. The loading space arrangement as claimed in claim 1, wherein the lock is positioned substantially in a region of a C pillar.

9. The loading space arrangement as claimed in claim 1, wherein the guide system has an uncoupling opening which is configured to be closed off again and which serves for the uncoupling of at least one guide element of the loading space cover, which guide element is able to be guided in the guide system, wherein the guide element is configured to be moved through the uncoupling opening when the loading space cover is pivoted from the folded position into the stowed position.

10. The loading space arrangement as claimed in claim 1, wherein the loading space cover forms a rear parcel shelf in the covering position, wherein cover elements of the loading space cover which are connected to one another in an articulated manner are, as substantially rigid planar structures, configured to dissipate to the guide system objects set down on the loading space cover.

11. The loading space arrangement as claimed in claim 1,
   wherein the foldable loading space cover is configured to form a horizontal parcel shelf in the covering position,
   wherein the foldable loading space cover is configured to form a compartment divider for preventing loads from entering a passenger compartment in the folded position, and
wherein the foldable loading space cover is configured to provide a load bearing surface interposed between a roof liner and a loading space in the stowed position.

12. The loading space arrangement as claimed in claim 1, wherein, the foldable loading space cover is entirely spaced apart from the guide system in the stowed position.

* * * * *